US006675258B1

(12) United States Patent
Bramhall et al.

(10) Patent No.: US 6,675,258 B1
(45) Date of Patent: Jan. 6, 2004

(54) METHODS AND APPARATUS FOR SEAMLESS FIRMWARE UPDATE AND PROPAGATION IN A DUAL RAID CONTROLLER SYSTEM

(75) Inventors: Walter Bramhall, Andover, KS (US); Rodney A. Dekoning, Augusta, GA (US); William P. Delaney, Wichita, KS (US); Ray Jantz, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 643 days.

(21) Appl. No.: 09/608,556

(22) Filed: Jun. 30, 2000

(51) Int. Cl.$^7$ ............................................. G06F 13/00
(52) U.S. Cl. ......................... 711/114; 711/100; 711/103
(58) Field of Search ................................. 711/100, 103, 711/112, 114, 154, 170

(56) References Cited

U.S. PATENT DOCUMENTS

| | | | | |
|---|---|---|---|---|
| 5,848,230 A | * | 12/1998 | Walker | 714/7 |
| 6,065,096 A | * | 5/2000 | Day et al. | 711/114 |
| 6,085,332 A | * | 7/2000 | El-Batal | 714/5 |
| 6,085,333 A | * | 7/2000 | DeKoning et al. | 714/7 |
| 6,446,153 B2 | * | 9/2002 | Cooper et al. | 710/260 |

* cited by examiner

Primary Examiner—Tuan V. Thai
(74) Attorney, Agent, or Firm—Lathrop & Gage, L.C.

(57) ABSTRACT

Methods and associated structure for updating and propagating firmware updates in a multiple redundant controller storage subsystem. The methods of the present invention assure that the storage subsystem remains operable processing host system I/O requests while the redundant controllers manage the firmware update process. At least one controller of a plurality of redundant controllers in the system remains available for processing of host I/O requests as the controllers manage the firmware update process. A management client process operable on an administrative system coupled to the first of the redundant storage controllers transfers a structured firmware file to the first redundant controller. The management client need perform no further management of the update process. Rather, the controller themselves manage the process in accordance with metadata stored within the firmware file along with the programmed instructions to be updated. The first controller and second controller then coordinate and sequence the update process to update both controllers with a compatible, consistent version of firmware. During the update process, one of the two redundant controllers remains operable and assumes ownership of all storage volumes in the subsystem to enable continued operation of host system I/O requests during the firmware update process. In this manner the storage system in accordance with the present invention provides a seamless firmware update process that is robust, seamless and imposes minimal management responsibility on a management client process.

17 Claims, 5 Drawing Sheets

METHODS AND APPARATUS FOR SEAMLESS FIRMWARE UPDATE AND PROPAGATION IN A DUAL RAID CONTROLLER SYSTEM

BACKGROUND OF THE INVENTION

1. Field of the Invention

The invention relates to the management of firmware embodied within an embedded control device and more specifically relates to the update of firmware within the controller of the storage subsystem.

2. Discussion of Related Art

A wide variety of devices include the embedded computing capabilities. The ubiquitous nature of such embedded computing ranges from simple consumer devices such as kitchen appliances and telephones to large scale devices and machines such as automobiles and planes through leading edge computing devices such as storage subsystems and network appliances.

In the context of storage subsystems in particular, it is known to use a storage controller device embedded within a storage subsystem. The storage controller device generally adapts the storage subsystem for connectivity with attached host computing systems. The host computing systems generate I/O requests for storage and retrieval of information in the storage subsystem. The storage controller device receives such I/O requests and manipulates and manages the storage devices within the storage subsystem to perform the host computing system I/O request.

In advanced storage subsystems, such as RAID (redundant array of inexpensive disks) subsystems, the storage controller device performs significant management functions to improve reliability and performance of the storage subsystem. To these ends, RAID storage controller devices tend to include a significant volume of firmware (stored programmed instructions) for performing the RAID storage management techniques. In general, RAID storage management techniques improve reliability of a storage subsystem by providing redundancy information stored on the disk drives along with the host system data to ensure access to stored data despite partial failures within the storage subsystem.

It is also known in such RAID storage subsystems to provide for redundant storage controller devices. Such redundant storage controllers are used to not only to provide reliability with respect to the controller devices of the subsystem but also to provide enhanced performance by using the redundant controllers to perform parallel processing in satisfying host computing I/O requests.

It is a problem in such embedded systems to provide for a reliable technique for updating the embedded firmware without significantly impacting the operation of the storage subsystem. Specifically, it is a problem for an external management client (external to the storage subsystem) to instruct the storage controller devices to update their firmware while continuing to process I/O requests from an attached host system.

Prior known techniques for permitting an external management client (i.e., an administrative user at a management computer console coupled to the storage subsystem) to update embedded storage controller firmware relied upon low-level "dumb" interfaces to manage the firmware download process. Such low-level techniques involve ensuring low-level sequencing of the download process, often in multiple stages. For example, the management client in accordance with prior known techniques would often have to be cognizant of a first stage of downloading relating to bootstrap software operable within the embedded storage controller followed by a subsequent stage interacting with the previously downloaded bootstrap software to load normal operation firmware. Further, prior known techniques often required that the management client ensure that the download process proceed cautiously and robustly taking care of abnormal conditions such as unexpected bus resets, etc. In particular, in the case of redundant storage controllers, the management client was responsible for ensuring synchronization and compatibility of the firmware operating within the redundant controllers.

Such management problems imposed significant complexity on the management client in managing the download process. It is therefore evident that a need exists to ensure proper sequencing of a firmware download process in a storage controller environment and for ensuring synchronization and compatibility of the firmware simultaneously operable in multiple redundant storage controllers while reducing the complexity incumbent upon the management client process.

SUMMARY OF THE INVENTION

The present invention solves the above and other problems, thereby advancing the state of the useful arts, by providing methods and associated structures for coordinating the download and synchronization of firmware within multiple redundant controllers. Specifically, the present invention comprises a firmware file format that includes metadata describing the structure and sequence of loading the storage controller firmware. The firmware file is self-describing to the redundant storage controllers to permit the storage controllers to sequence their updating process independent of the management client. Further, an automated code synchronization method and protocol is defined for communications between the multiple redundant storage controllers to coordinate the synchronization and compatibility of firmware operable therein.

The code synchronization among the multiple storage controllers includes steps to pass "ownership" of a first controller's storage volumes to another controller and to restore ownership of the passed volumes after the first controller's firmware is successfully updated. This feature permits continued operation of the storage subsystem on requests from an attached host. At all times, at least one of the two redundant controllers will be operating and available to the host system to perform I/O request processing.

Specifically, the management client, under the direction of an administrative operator, transfers the formatted firmware file to a first controller with a request that the first controller update its firmware (and then the firmware of its redundant mate). I/O requests continue to be processed by the other controller while the first controller initiates its firmware update process. The first controller requests the second redundant controller to take control of the storage volumes nominally owned by the first controller. Upon such transfer of ownership, the first controller completes its firmware update process in accordance with the metadata provided in the firmware file. When the first controller has completed its firmware update process and has re-started itself to load and run the new firmware, it requests restoration of ownership of its volumes from the second controller. In addition, the first controller takes temporary ownership of the volumes owned by the second controller. Upon restoration of ownership of its storage volumes and those of the second controller, the first controller performs a reset of the second controller. Upon initialization of the second controller, the second controller inquires of the first controller whether its firmware is up to date. If not, the first controller sends the updated firmware file to the second controller. The second controller updates its firmware in accordance with the metadata and code in the firmware file. The second controller then resets itself and again inquires of the first controller if its firmware is up to date. If not, the sequence repeats until successful. The second controller requests restoration of ownership of its storage volumes from the first controller when the firmware update process completes successfully.

In accordance with this technique, the multiple redundant storage controllers are assured to be operating a synchronized, compatible level of firmware. Processing of I/O requests on behalf of attached host systems continues throughout the update process such that the host system is essentially shielded from knowledge of the update process.

These and other features and advantages of the invention will be further described and more readily apparent from a review of the detailed description of the preferred embodiments which follows.

BRIEF DESCRIPTION OF THE DRAWINGS

The following detailed description of the preferred embodiments can best be understood when read in conjunction with the following drawings, in which.

DETAILED DESCRIPTION OF THE PREFERRED EMBODIMENTS

While the present invention is susceptible to various modifications and alternative forms, specific embodiments thereof have been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
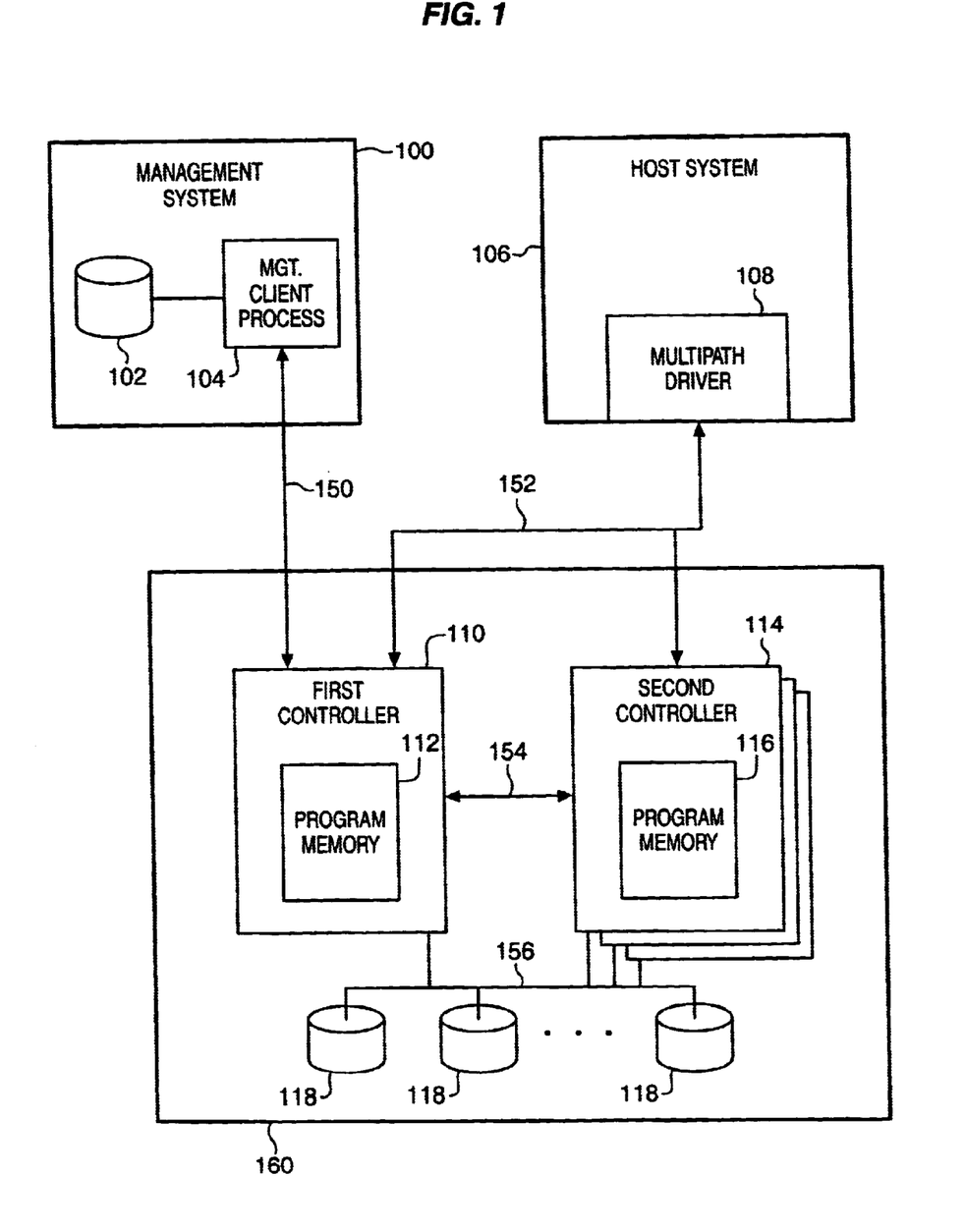
FIG. 1 is a high-level block diagram of a dual redundant controller storage subsystem in which the present invention is applied.

FIG. 1 is a block diagram of a system in accordance with the present invention wherein multiple storage controllers 110 and 114 provide for seamless firmware update and synchronization procedures with minimal intervention required by a management system 100. In particular, a management system 100 includes a management client process 104 and associated local storage 102. The management client process 104, in general, provides a user interface for an administrative user to manage storage system 160. Management client process 104 within management system 100 interfaces to first storage controller 110 via a dedicated management communication paths 150. However, unlike prior designs, management client process 104 merely transmits an updated firmware file to controller 110 via path 150. Beyond this file transfer, management client process 104 and management system 100 has no further responsibilities in insuring coordination and completion of the firmware update process. Rather, first and second storage controllers 110 and 114 cooperate in accordance with the present invention to complete the firmware update and synchronization procedures independent of management system 100 and in a manner that is seamless with respect to operation of the storage subsystem 160 and attached host systems.

An attached host system 106 includes multipath driver 108 for communicating with first and second storage controllers 110 and 114 of storage system 160 via path 152. Host system 106 may direct I/O requests via path 152 to either or both of first and second controllers 110 and 114. Multipath driver 108 host system 106 will detect errors that occur accessing a volume via one controller (i.e., 110 or 114) and re-issue the I/O request to the alternate controller automatically. Such errors may include an explicit error status returned from the first controller or timeouts due to an unresponsive controller.

As discussed in further detail herein below, first and second controllers 110 and 114 include capabilities to transfer ownership of storage volumes in the system from one controller to another as required to complete an I/O request sent to the storage system 160 by an attached host system 106. The re-issued I/O request from the multipath driver 108 are therefore processed by an appropriate one of the controllers that presently owns the identified storage volume of the request and is operable to process the I/O request.

Inter-controller communication path 154 is used for any communications required to coordinate such transfer of ownership of storage volumes between controllers 110 and 114. Storage controllers 110 and 114 store and retrieve data on disk drives 118 via path 156.

As is known in the art, first and second controller 110 and 114 perform significant higher level storage management on the attached disk drive 118. In particular, in the preferred embodiment, controllers 110 and 114 perform RAID management to improve reliability of the storage system 160 and to improve overall performance of the system. It is common that the plurality of disk drives 118 are logically subdivided by operation of the controllers 110 and 114 into subsets. Such subsets may be referred to as volumes or storage volumes. In the case of RAID storage management, it is common to refer to the subsets as logical units or LUNs or redundancy groups. As used herein, the term volume or storage volume is intended to represent all such logical groupings that subdivide the disk drives. It should be noted that the subdivision may be as simple as defining a single storage volume that includes all disk drives of the system.

Controller 110 includes program memory 112 for storing firmware that, when executed, defines operation of controller 110. In like manner, controller 114 includes program memory 116 for storing its operational firmware. It is critical in such a multiple controller environment to ensure compatibility between revisions of firmware operating in the cooperating multiple controllers 110 and 114. As noted above, prior techniques imposed a significant burden on the management system to ensure reliable and robust synchronization and updating of the firmware resident and operating in storage controllers 110 and 114.

By contrast, controllers 110 and 114 of the present invention cooperate via communications over path 154 to manage the download, update, and synchronization processing of the firmware operating in the controllers. The only function performed by management system 100 and management client process 104 is that of initially transferring a copy of the firmware file to the first controller 110. Beyond that step, controllers 110 and 114 complete the update and synchronization process independent of management system 100. This self-management of the firmware update and synchronization process enables enhanced reliability and robustness of the firmware update process. Further, as discussed herein below, the update and synchronization process in accordance with the present invention is seamless in that the storage subsystem 160 continues to process I/O requests on behalf of attached host systems during the update and synchronization processing.

As shown in FIG. 1, second controller 114 may be any number of other controllers in storage system 160. A first controller 110 is often identified as a primary controller and is responsible for initially receiving updated firmware files and other management functions provided by management system 100 via path 150. Any number of second controllers 114 may operate in conjunction with primary controller 110 to perform the update and synchronization processing described further herein below. Those skilled in the art will recognize that the first controller 110 may perform the methods defined herein in conjunction with any number of second controllers to assure update and synchronization of the firmware in all controllers of a multiple controller storage system. The methods presented herein are presumed to be performed between a first controller and a single second controller. Extension of these methods to multiple second controllers is a matter of design choice well known to those skilled in the art.

Those skilled in the art will recognize that the various communication paths 150 through 156 may be any of several well-known, standard communication media and protocols. For example, communication paths 150 between management system 100 and a primary or first controller 110 may be a simple serial connection, a network connection, a SCSI connection, etc. Path 152 connecting host system 106 and multipath driver 108 to controllers 110 and 114 of storage system 160 may be, for example, a parallel SCSI connection, a Fibre Channel connection, or any of several other standard communication media and protocols used to connect mass storage subsystems with host computers. Path 156 may be any of several well-known communication media and protocols used for connecting to individual mass storage devices such as parallel SCSI, Fibre Channel, and others. Lastly, path 154 between the cooperating storage controllers may be any of several well-known communication media and protocols including simple serial communications, Fibre Channel, parallel SCSI, and others. Further, path 154 preferably includes at least one signal path that enables the first controller to apply an external reset signal to a second controller to thereby reset the operation of the second controller.

Figure 2:
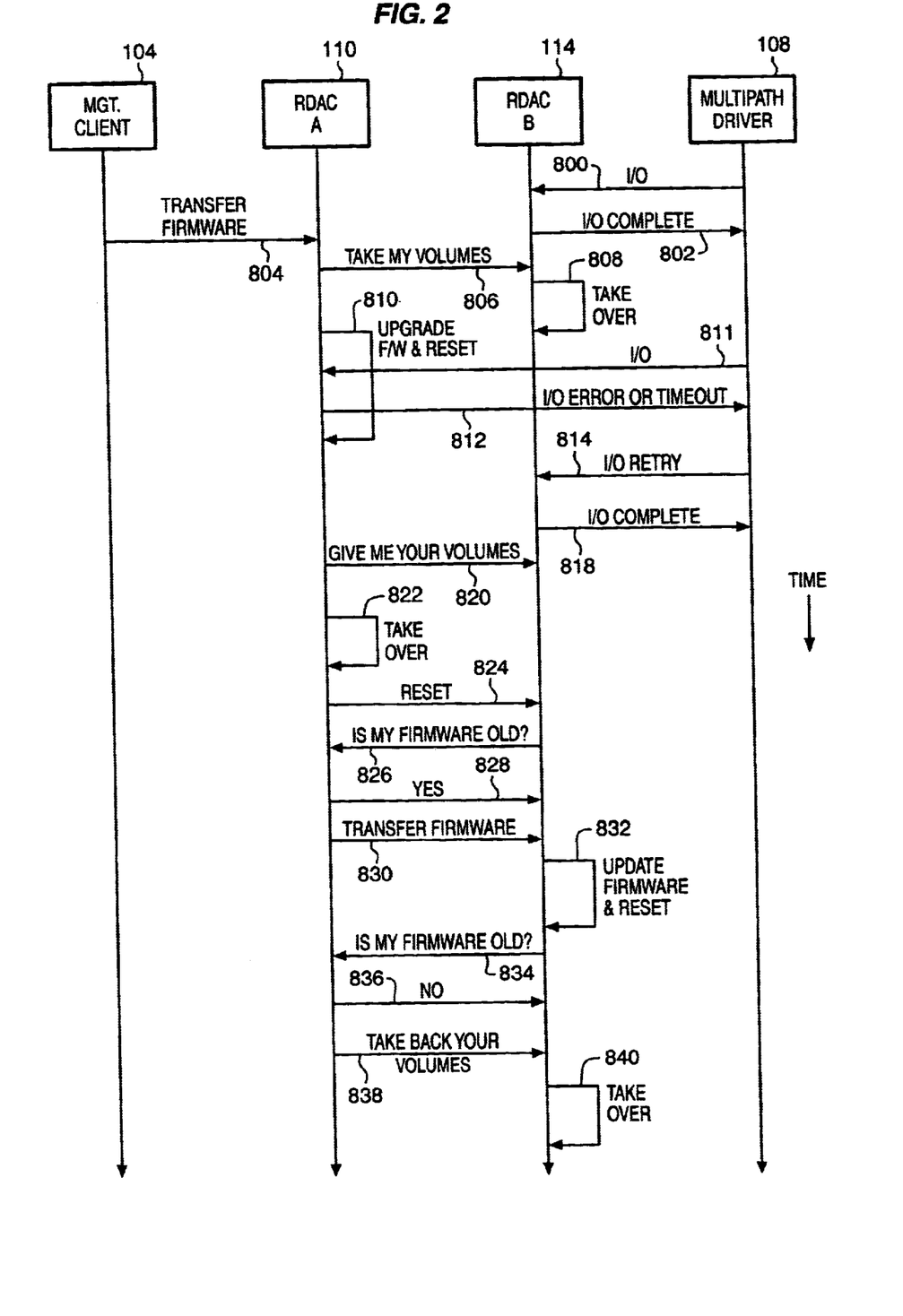
FIG. 2 is a timing diagram depicting the operations of the methods of the present invention over time to effectuate continued availability of the storage system during upgrade and re-initialization of one of the multiple controllers.

FIG. 2 is a timing diagram depicting the protocol used for exchanging information among the various components shown in FIG. 1 over time. The downward pointing arrows are indicative of increasing time while the horizontally directed arrows depict an exchange of information in the direction of the arrows pointing from its origin to its final endpoint. The vertical downward arrows descend from each of four elements that participate in the update and synchronization protocol, namely: management client process 104, controller 110, controller 114, and multipath driver 108. As described herein, the horizontal directed arrows will be referred to simply as "arrow X" where "X" is the associated reference number.

Arrow 800 represents an I/O request directed from a host computer through multipath driver 108 to the second controller 114 within a storage subsystem. Arrow 802 represents the normal I/O completion of such a request to an operating controller. Such normal I/O requests are not, per se, an aspect of the update and synchronization process of the present invention. Rather, they are shown in FIG. 2 to suggest that I/O requests continue to be processed as the firmware update and synchronization proceeds in accordance with the present invention.

Arrow 804 indicates a request initiated by an administrative user of the management client process 104 to request that firmware in the storage subsystem controllers be updated. Specifically arrow 804 represents the transfer of an updated firmware file from the management system to first controller 110.

In response to receipt of such a firmware update request, at arrow 806 first controller 110 requests that the second controller 114 take over ownership of the storage volumes presently owned by first controller 110. Arrow 808 indicates second controller 114 performing processing required to take over ownership of storage volumes presently owned by first controller 110. From this point forward, new I/O requests directed to storage volumes previously owned by first controller 110 will be processed by second controller 114.

Arrow 810 indicates the processing within first controller 110 to upgrade the program memory within first controller 110 with the upgraded firmware received from management client 104. During the processing to update the firmware in first controller 110 and the associated reset or reboot, arrow 811 represents an I/O request from the multipath driver 108 directed to a volume normally owned by the first controller 110. Since the first controller 110 is presently engaged in the upgrade of firmware and/or the associated reset and reboot operation, it cannot process the I/O request. However, its volume have been transferred to the second controller 114 so that the I/O request may be processed by that controller. Arrow 812 indicates an error response generated by first controller 110 returned to the multipath driver 108 indicative of an I/O error in the processing of the I/O request presently outstanding (represented by arrow 811 above). It will be noted by those skilled in the art that it is not necessary for the first controller 110 to return a specific error indication. Rather, the multipath driver 108 may simply detect an error condition as a time-out in waiting for any response.

In response to the I/O error message (or timeout condition), arrow 814 indicates a retry request by multipath driver 108 to transfer the aborted I/O request (arrow 800) to second controller 114 for continued processing. Second controller 114 eventually completes both outstanding I/O requests (arrow 800 and arrow 802) and returns appropriate I/O completion messages to multipath driver 108 as indicated by arrows 816 and 818.

Following completion of the upgrade of firmware in the first controller 110, arrow 820 indicates a request by first controller 110 for second controller 114 to relinquish ownership of all storage volumes presently owned by second controller 114. This includes the storage volumes previously owned by second controller 114 as well as the storage volumes previously owned by first controller 110 (prior to the take over of ownership at arrow 808). Arrow 822 then indicates the processing within first controller 110 to assume ownership of all storage volumes from second controller 114.

Upon completion of the take over processing of arrow 822, arrow 824 represents processing by first controller 110 to force a reset condition on second controller 114. The presently loaded firmware in the second controller performs, as part of its initialization at arrow 826, an inquiry of first controller 110 to determine if the firmware presently stored in second controller 114 is up-to-date or obsolete. Arrow 828 indicates a response from first controller 110 to second controller 114 indicative that the firmware presently operating in second controller 114 is obsolete or otherwise incompatible with the newly upgraded firmware now operating in first controller 110. In addition to such a status response, arrow 830 represents the transfer to the second controller 114 of the newly upgraded firmware now resident in first controller 110.

In response to the transfer of an upgrade firmware file, second controller 114 then updates its firmware in program memory and upon completion of the update performs a reset. Upon initialization following the reset, second controller 114 again issues an inquiry at arrow 834 to first controller 110 to determine whether it's nearly upgraded firmware is still obsolete or otherwise incompatible with that of first controller 110. Assuming the upgrade processing of arrow 832 was successful, the response from first controller 110 to second controller 114 indicated by arrow 836 will show that the firmware now resident in program memory of second controller 114 is up-to-date or otherwise compatible with the firmware presently operating in first controller 110.

With knowledge that both controllers 110 and 114 are now operating using compatible firmware, first controller 110 at arrow 838 requests second controller 114 to restore ownership of storage volumes previously owned by second controller 114. Arrow 840 then represents the processing within second controller 114 to restore ownership of all storage volumes previously owned by second controller 114.

Figure 3:
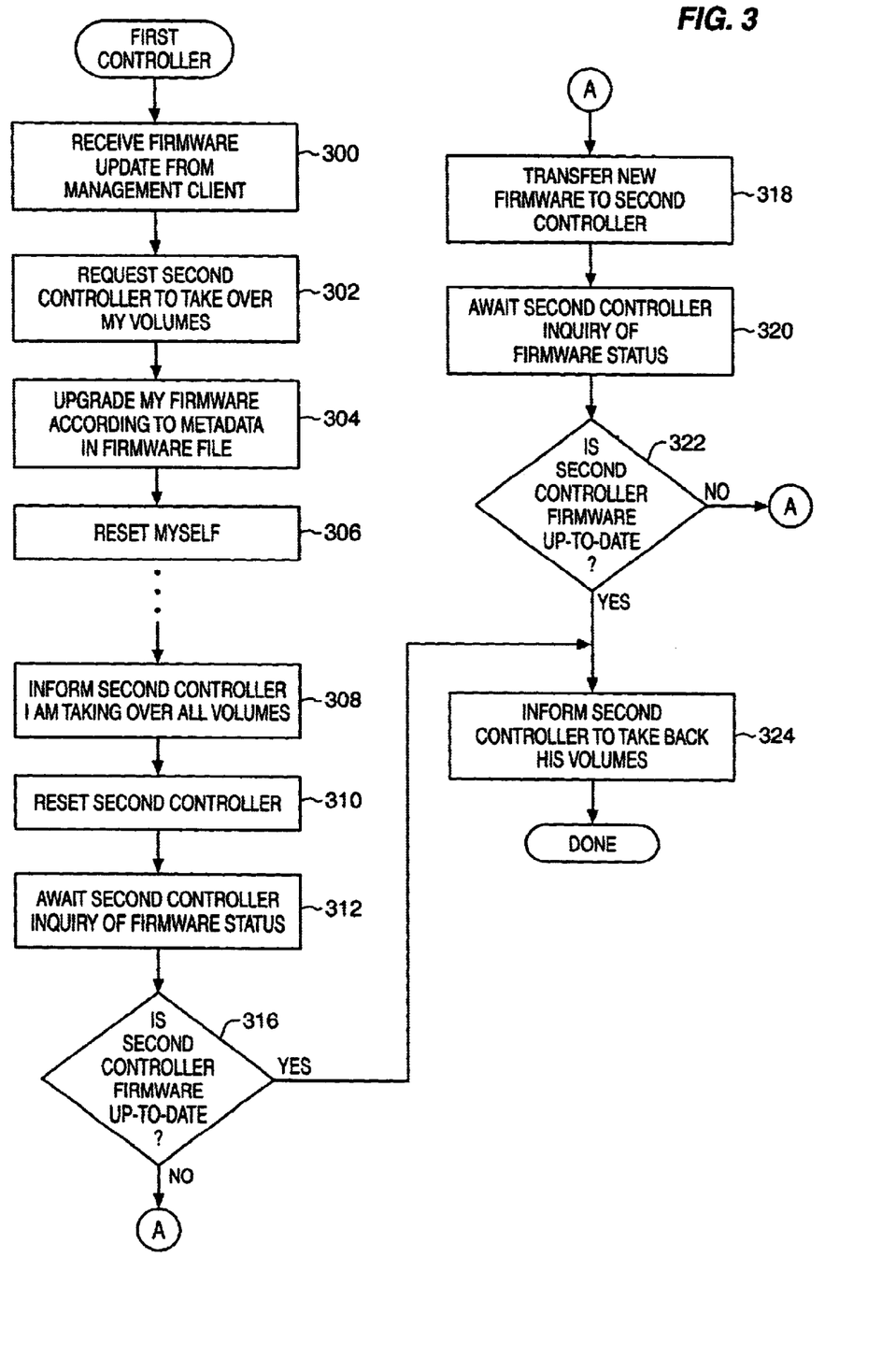
FIG. 3 is a flowchart describing the methods of the present invention operable in a first of the multiple controllers to effectuate continued availability of the storage system during upgrade and re-initialization of one of the multiple controllers.
Figure 4:
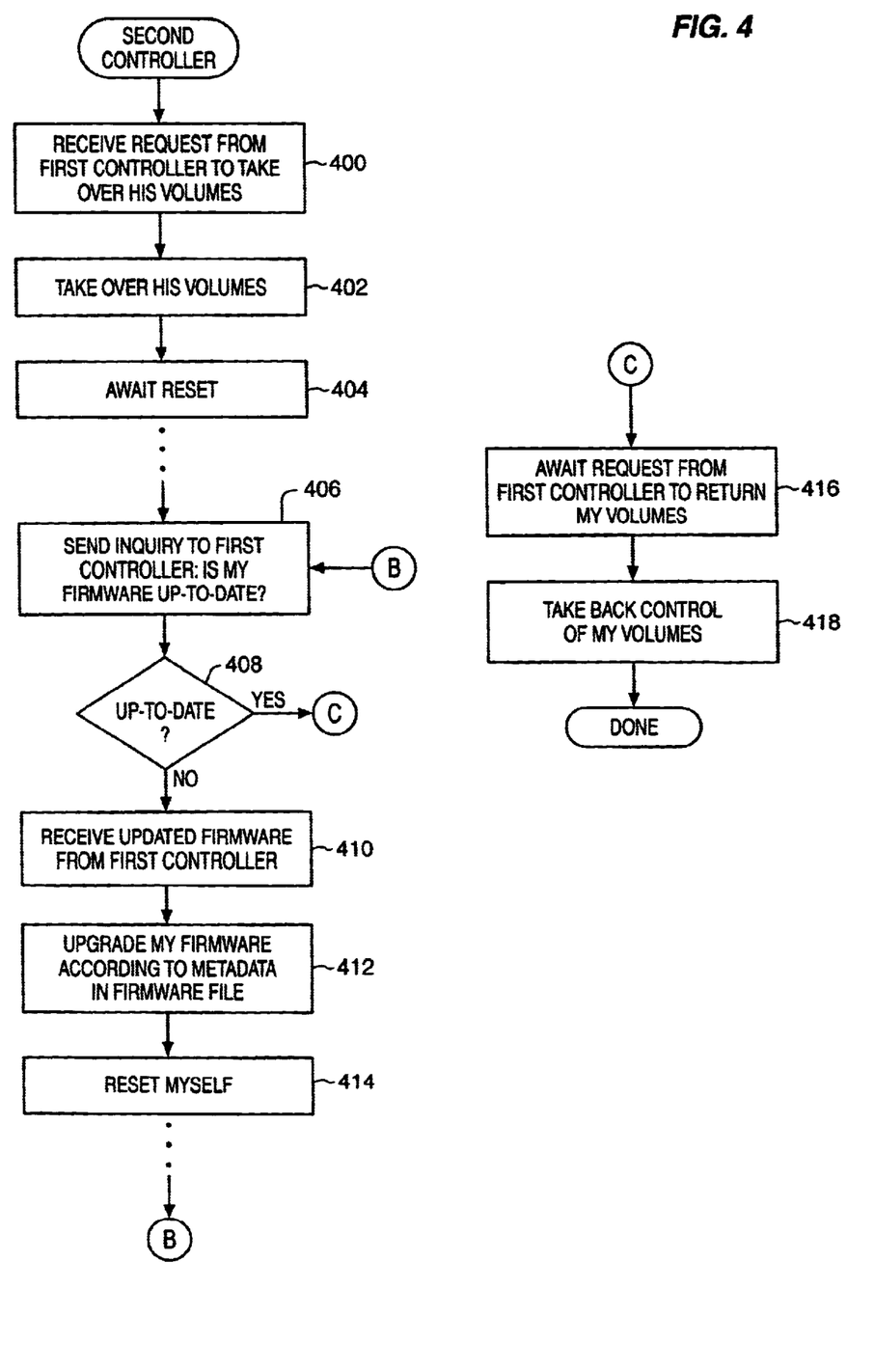
FIG. 4 is a flowchart describing methods of the present invention operable in a second of the multiple controllers to effectuate continued availability of the storage system during upgrade and re-initialization of one of the multiple controllers.

FIGS. 3 and 4 are flowcharts describing methods operable within first controller 110 and second controller 114 to perform the update and synchronization process described above in FIG. 2. Specifically, FIG. 3 is a flowchart describing the processing within first controller 110 and FIG. 4 is a flowchart describing the processing within second controller 114.

Those skilled in the art will recognize that the flowcharts of FIGS. 3 and 4 represent only a small portion of the total processing within such storage controllers. Specifically, only that processing which relates to the update and synchronization procedures of the present invention are shown in flowcharts. Those skilled in the art will recognize well known design choices as to integration of these methods with the overall methods of operation of the storage controllers to perform storage management functions within the storage subsystem. Further, those skilled in the art will recognize a variety of equivalent methods and techniques for coordinating the update process among two or more storage controllers independent of a management system or client. The flowcharts of FIGS. 3 and 4 are therefore exemplary of one such preferred embodiment of the methods of the present invention.

Element 300 represents processing within the first controller to receive a firmware update request from an administrative user operating in management client process on a management system. Specifically, the firmware update request takes the form of the transfer of a formatted firmware file from the management client process to the first controller in the storage subsystem. At element 302, the first controller requests the second controller to take ownership of all storage volumes presently owned by the first controller. This step is in preparation for the upgrade process to be performed within the first controller. During the upgrade of the firmware the first controller will be incapable of processing I/O requests generated from an attached host. By taking over ownership of the storage volumes presently owned by the first controller, the second controller may continue processing host I/O requests destined for the first controller's storage volumes. In this manner, the methods of the present invention provide a seamless upgrade in the sense that an attached host system will not be aware of any loss of service by the storage subsystem. Rather, the storage subsystem will continue to operate essentially normally during the firmware upgrade procedure.

Element 304 then represents the processing within the first controller to upgrade the firmware of the first controller in accordance with the programmed instructions and metadata within the received firmware file. Following upgrade of its own firmware, the first controller resets itself to initiate operation of the newly upgraded firmware. Sometime after the reset completes (as indicated by the dots between element 306 and 308), element 308 then informs the second controller that the first controller is taking over ownership of all volumes in the storage subsystem. In particular, the first controller restores ownership of the storage volumes it previously owned as well as the storage volumes previously owned by the second controller.

The first controller then issues a reset on the second controller element 310. In the preferred embodiment, the communication paths between the first and second controllers includes a signal path for assertion of the reset signal on the second controller by operation of the first controller. Those skilled in the art will recognize a variety of equivalent methods for asserting a reset condition between the controllers. In addition to the preferred embodiment of a reset specific signal path, the controllers may exchange messages that cause the receiving controller to initiate a reset through programmed instructions.

The first controller at element 312 then awaits an inquiry for the second controller as to the status of the firmware operating within the second controller. When such an inquiry is received, element 316 is operable to determine the present status of the firmware operating in the second controller. In particular, the first controller determines whether the firmware revision presently operable within the second controller is up-to-date and compatible with the firmware revision level presently operable within the first controller. The inquiry message received as noted above from the second controller includes revision of information regarding the firmware presently operable within the second controller.

If element 316 determines that the firmware presently operable in second controller is compatible with that operable within the first controller, processing continues at element 324 as discussed below to return storage volumes to normal ownership and to continue normal operation of the storage subsystem. If element 316 determines that the firmware revision operable to second controller is incompatible with that operable within the first controller, processing continues at element 318 (label "A"). Element 318 is operable to transfer to the second controller the upgraded software presently operable within the first controller (following successful upgrade of its firmware as discussed above with regard to element 304). The firmware so transferred is in the same structured file format as received by the first controller from the management client. As above, the structured firmware file includes metadata required for the second controller to perform its upgrade processing.

Upon completion of the upgrade processing within the second controller, the second controller will reset itself. Upon such re-initialization, the second controller will again inquire of the first controller whether the firmware presently operable in the second controller is compatible with that operable within the first controller. If the firmware upgrade processing performed by the second controller was successful, the firmware in both controllers will now be compatible and up-to-date. Element 320 is therefore operable in the first controller to await receipt of the inquiry message from the second controller indicating that it has completed its upgrade processing and it again inquires as to the compatibility between the firmware of the first controller and that of the second controller. Element 322 is then operable to determine whether the firmware presently operable in the second controller is compatible with that operable within the first controller. If not, processing continues by looping back to element 318 (label "A") to attempt the firmware file transfer and upgrade process again. If element 322 determines that the upgrade process in the second controller was successful and that the firmware operable in the first and second controllers is compatible, element 324 is next operable to inform the second controller that it should restore ownership of the storage volumes normally owned by the second controller. The processing of the upgrade methods of the present invention within the first controller is then complete.

FIG. 4 is a flowchart describing processing of methods of the present invention within the second controller to perform the cooperative upgrade processing described above in FIG. 3 with regard to the first controller. In particular, element 400 within the second controller is operable to receive a request from the first controller to assume ownership of storage volumes normally owned by the first controller within the second controller. Element 402 is then operable to take ownership within the second controller of the storage volumes normally owned by the first controller. The second controller now has ownership of all storage volumes normally owned by the first controller as well as the storage volumes normally owned by the second controller. The second controller may therefore continue to process host I/O requests on behalf of storage volumes normally owned by either the first or second controller. In this manner, operation of the storage subsystem continues in a seamless manner with respect to attached host systems while the upgrade of firmware proceeds.

Element 404 then awaits the externally applied reset signal from the first controller. As noted above, when the first controller has completed its upgrade process it acquires ownership of all storage volumes and then forces a reset on this the second controller. Until such an external reset signal applies, as noted above, the second controller processes I/O requests from attached host systems directed to all storage volumes normally owned by either the first controller or the second controller.

When processing of the second controller reinitializes following the externally applied reset signal, element 406 is operable to send an inquiry message to the first controller inquiring as to whether the firmware presently operable within the second controller is up-to-date and compatible with that operable within the first controller. As noted above, the inquiry message includes version information regarding the firmware presently operable within this, the second, controller to enable the first controller to determine whether the two versions of software compatible. Element 408 then determines whether the response from the first controller indicates that the firmware within the second controller is up-to-date or not. If element 408 determines that the firmware in this, the second, controller is not up-to-date as indicated by the response from the first controller, element 410 is next operable to receive the firmware file transferred from the first controller to this, the second, controller. Element 412 then upgrades the firmware residing in the program memory of this, the second, controller in accordance with the metadata in the firmware file. Upon completion of the upgrade processing of element 412, element 414 is operable to reset this, the second, controller. Upon completion of the reset sequence, processing continues by looping back to element 406 to verify that be newly upgraded firmware now resident in the second controller is compatible with that of the first controller.

Once element 408 determines that the firmware in this, the second, controller is compatible with that of the first controller as indicated by the message received from the first controller, processing continues at element 416 (label "C"). Element 416 is operable to await a request from the first controller that this, the second, controller restore ownership of all storage volumes normally owned by this the second controller. In response to receipt of such a request, element 418 is next operable to restore ownership of the storage volumes normally owned by this, the second, controller. The upgrade processing within the second controller is then complete and both the first and second controllers continue to operate with compatible, up-to-date firmware.

Figure 5:
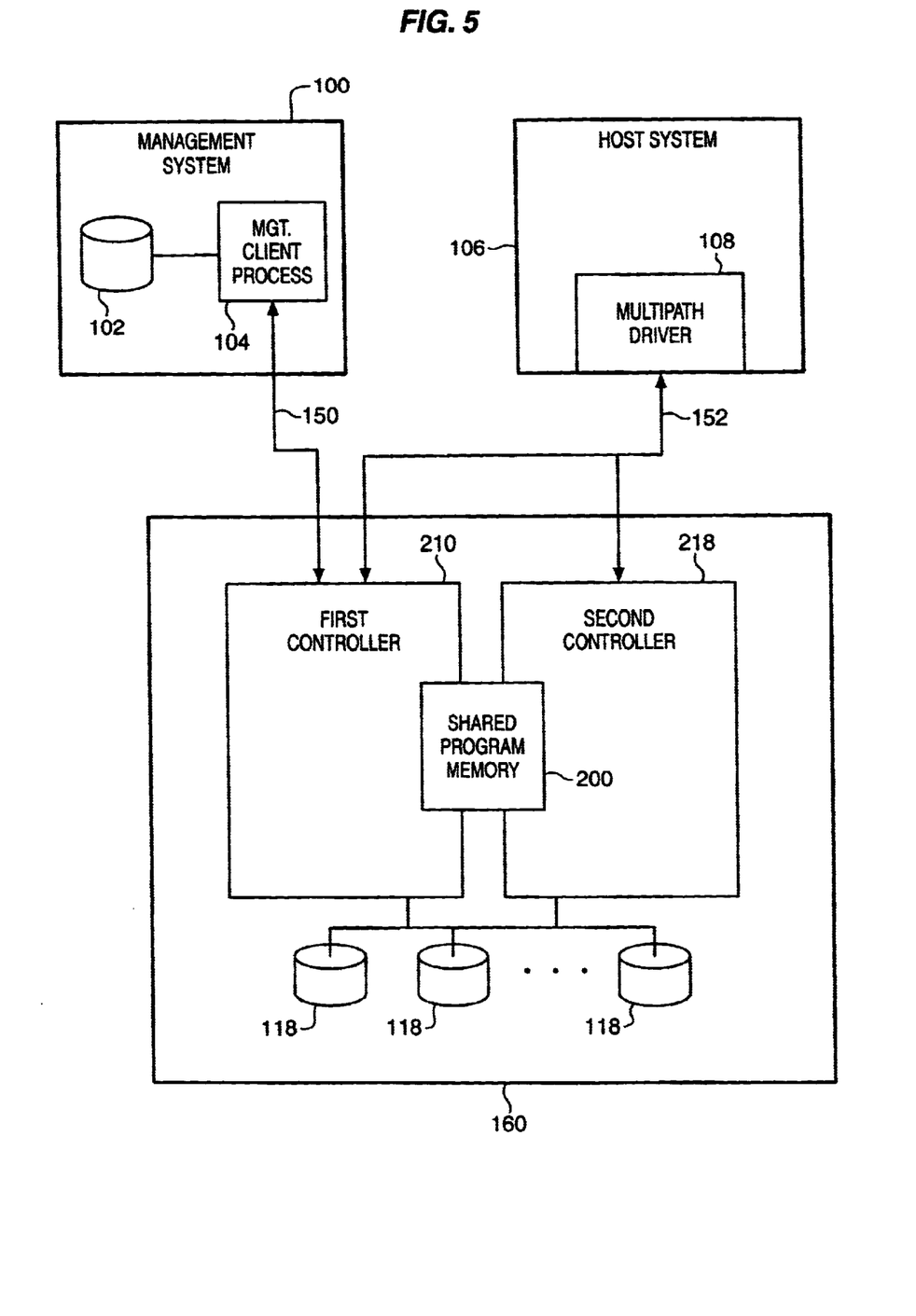
FIG. 5 is a high level block diagram of al an alternate embodiment of a storage system having shared program memory in which the present invention is applied.

FIG. 5 is a block diagram of an alternate embodiment of the present invention in which dual redundant controllers 210 and 214 within storage subsystem 160 share a common program memory element 200. In such a shared program memory embodiment, the dual redundant controllers 210 and 214 share the program memory in such a manner that upgrading the firmware for one controller achieves upgrading for both controllers in a manner that is assured to be compatible.

Key to the present invention in all embodiments is that at least one of the multiple redundant controllers remains active to process host I/O requests while another controller is unavailable due to firmware upgrade processing and/or re-initialization. The period of time during which a controller may be unavailable may vary in accordance with specific implementations and design choices. For example, the actual download and upgrade process for receiving new firmware may or may not render the controller receiving the new firmware unavailable. The received firmware may, for example, be stored in a second memory in the controller that does not interfere with operation of the controller until the controller is re-initialized (re-booted). In such a configuration, the controller may be unavailable only during the period of re-initialization. In other exemplary embodiments, the process of downloading new firmware may in and of itself render the controller unavailable for processing of host I/O requests. In all such cases, the present invention provides that another controller remains available to process host I/O requests. Where redundant controller share a common program memory as in FIG. 5, the common shared memory may be loaded with new code that is executed only once the controllers are re-initialized. In such a case, a first controller re-boots while the other controller remains available for processing host I/O requests.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for updating firmware in a storage system having a plurality of volumes and having a plurality of controllers comprising the steps of:

receiving a request from a management system to update program instructions in a first controller of said plurality of controllers; and in response to receiving and independent of further interaction with said management system, performing the steps of:

transferring ownership of volumes owned by said first controller of said plurality of controllers to a second controller of said plurality of controllers prior to updating program instructions in said first controller; and updating said program instructions within said first controller.

2. The method of claim 1 wherein the step of transferring includes the step of:

processing I/O requests within said second controller for volumes normally owned by said first controller.

3. The method of claim 2 further comprising the steps of:

restoring ownership by said first controller of volumes transferred to said second controller, independent of said management system, prior to updating program instructions in said first controller.

4. The method of claim 3 wherein the step of restoring includes the step of:

discontinuing processing of I/O requests within said second controller for volumes normally owned by said first controller.

5. A method for updating firmware in a dual controller I/O system comprising the steps of:

transferring a firmware file from a management system to a first controller in said dual controller I/O system wherein said firmware file includes metadata describing the content of the firmware file;

updating program instructions within said first controller independent of said management system;

determining the compatibility of firmware presently operating in a second controller of said dual controller I/O system independent of said management system;

transferring said firmware file from said first controller to said second controller, independent of said management system, in response to a determination that said second controller has incompatible firmware; and updating program instructions within said second controller, independent of said management system, in response to receipt of said firmware file by said second controller.

6. The method of claim 5 further comprising the step of:

resetting said second controller by action of said first controller independent of said management system prior to transferring said firmware file from said first controller to said second controller in response to a determination that said second controller has incompatible firmware.

7. The method of claim 5 further comprising the steps of:

resetting said first controller by action of said first controller independent of said management system following the step of updating program instructions within said first controller; and resetting said second controller by action of said second controller independent of said management system following the step of updating program instructions within said first controller.

8. The method of claim 5 wherein said I/O system is a storage system having a plurality of volumes, said method further comprising the steps of:

transferring ownership of volumes owned by said first controller to said second controller, independent of said management system, prior to updating program instructions in said first controller.

9. The method of claim 8 wherein the step of transferring includes the step of:

processing I/O requests within said second controller for volumes normally owned by said first controller.

10. The method of claim 9 further comprising the steps of:

restoring ownership by said first controller of volumes transferred to said second controller, independent of said management system, prior to updating program instructions in said first controller.

11. The method of claim 10 wherein the step of restoring includes the step of:

discontinuing processing of I/O requests within said second controller for volumes normally owned by said first controller.

12. In a RAID storage subsystem having multiple controllers, a method for ensuring compatibility of firmware operable in said multiple storage controllers comprising the steps of:

receiving a request from a management system to update firmware; and independent of further interaction with the management system, performing the steps of:

a) determining, within a first controller of said multiple controllers, whether firmware in another controller of said multiple controllers is compatible with firmware in said first controller;

b) taking control, within said first controller, of storage volumes within said subsystem owned by the other controller in response to a determination that firmware in the other controller is not compatible with firmware in said first controller;

c) updating firmware in the other controller using firmware in said first controller;

d) returning control of said storage volumes to the other controller; and e) repeating steps a) through d) for each controller of said multiple controllers other than said first controller.

13. The method of claim 12 wherein the step of updating includes the step of:

resetting the other controller from said first controller.

14. A storage subsystem comprising:

a first storage controller including a host interface for connecting to a host system and an inter-controller interface for connecting to another storage controller;

a second storage controller including a host interface for connecting to a host system and an inter-controller interface for connecting to another storage controller; and a communication medium coupled to the inter-controller interface of said first controller and to the inter-controller interface of said second controller to communicate information regarding firmware compatibility in said first controller and said second controller, wherein the first storage controller is adapted to receive firmware from a management system and wherein the first storage controller is further adapted to update the firmware of the first controller and the firmware of the second controller independent of further interaction with the management system.

15. The storage subsystem of claim 14 further comprising:

first storage volumes owned by said first controller; and second storage volumes owned by said second controller.

16. The storage subsystem of claim 15 further comprising:

a first update control element within said first controller coupled to said communication medium; and a second update control element within said second controller coupled to said communication medium, wherein said first update control element is operable to pass ownership of said first storage volumes from said first controller to said second controller via said second update control element, wherein said first update control element is operable to update the firmware within said first controller in response to passage of ownership of said first storage volumes, and wherein said first update control element restores ownership of said first storage volumes to said first controller from said second controller via said second update control element upon successful completion of said update of firmware.

17. The storage subsystem of claim 16 wherein said first update element is operable in conjunction with said second update control element to determine whether firmware in said second controller is compatible with the firmware in said first controller, wherein said first update control element is operable to take ownership of said second storage volumes from said second controller via said second update control element in response to a determination that the firmware in said second controller is not compatible with the firmware in said second controller, wherein said first update control element is operable to transfer compatible firmware to said second control element via said second update control element in response to a determination that the firmware in said second controller is not compatible with the firmware in said second controller, wherein said second update control element is operable to update the firmware in said second controller, and wherein said first update control element is operable to restore ownership of said second storage volumes to said second controller via said second update control element in response to completion of the update of the firmware in said second controller.

* * * * *